(12) United States Patent
Feng et al.

(10) Patent No.: US 12,384,115 B2
(45) Date of Patent: Aug. 12, 2025

(54) DISPLAY GUIDED HIGH-ACCURACY ROBOTIC NAVIGATION AND MOTION CONTROL SYSTEM AND METHODS

(71) Applicant: NEW YORK UNIVERSITY, New York, NY (US)

(72) Inventors: Chen Feng, New York, NY (US); Xuchu Xu, Brooklyn, NY (US)

(73) Assignee: New York University, New York, NY (US)

( * ) Notice: Subject to any disclaimer, the term of this patent is extended or adjusted under 35 U.S.C. 154(b) by 324 days.

(21) Appl. No.: 17/738,164

(22) Filed: May 6, 2022

(65) Prior Publication Data

US 2022/0371284 A1 Nov. 24, 2022

Related U.S. Application Data

(60) Provisional application No. 63/185,644, filed on May 7, 2021.

(51) Int. Cl.
*B29C 64/393* (2017.01)
*B25J 9/16* (2006.01)
*B29C 64/209* (2017.01)
*B29C 64/227* (2017.01)
(Continued)

(52) U.S. Cl.
CPC ........... *B29C 64/393* (2017.08); *B25J 9/1607* (2013.01); *B25J 9/163* (2013.01); *B25J 9/1664* (2013.01); *B25J 9/1692* (2013.01); *B25J 9/1697* (2013.01); *B29C 64/209* (2017.08);
(Continued)

(58) Field of Classification Search
CPC ... B29C 64/393; B29C 64/209; B29C 64/227; B29C 64/118; B25J 9/1607; B25J 9/163; B25J 9/1664; B25J 9/1692; B25J 9/1697; B33Y 30/00; B33Y 50/02; G05B 2219/39271; G05B 2219/49007; G05B 2219/49008; G05B 2219/49023; G05B 19/4099
See application file for complete search history.

(56) References Cited

U.S. PATENT DOCUMENTS 9,327,406 B1 * 5/2016 Hinterstoisser ........ B25J 9/1697
11,422,530 B2 * 8/2022 Seibert ............... G05B 19/4099
11,912,513 B1 * 2/2024 Polido .................... B25J 9/1697
(Continued)

FOREIGN PATENT DOCUMENTS

CN 108349079 A * 7/2018 ............ B25J 19/021
CN 105818167 B * 10/2018 ............ B25J 9/1653
(Continued)

OTHER PUBLICATIONS

A mobile 3D printer for cooperative 3d printing (Year: 2017).*
(Continued)

*Primary Examiner* — Kyle T Johnson
(74) *Attorney, Agent, or Firm* — Riverside Law LLP

(57) ABSTRACT

A display guided robotic navigation and control system comprises a display system including a display surface and a display device configured to display an image including a visual pattern onto the display surface, a robotic system including a mobile robotic device and an optical sensor attached to the mobile robotic device, and a computing system communicatively connected to the display system and the robotic system. Related methods are also disclosed.

21 Claims, 13 Drawing Sheets

(51) Int. Cl.
*B33Y 30/00* (2015.01)
*B33Y 50/02* (2015.01)
(52) U.S. Cl.
CPC ............ *B29C 64/227* (2017.08); *B33Y 30/00* (2014.12); *B33Y 50/02* (2014.12)

(56) References Cited

U.S. PATENT DOCUMENTS

| | | | |
|---|---|---|---|
| 2002/0091466 A1* | 7/2002 | Song | G01S 17/931 701/23 |
| 2010/0131235 A1* | 5/2010 | Aoba | G06T 7/70 356/615 |
| 2012/0121161 A1* | 5/2012 | Eade | G06F 16/444 901/1 |
| 2014/0374933 A1* | 12/2014 | Flitsch | E01C 23/0966 425/62 |
| 2015/0168954 A1* | 6/2015 | Hickerson | G01S 17/04 901/1 |
| 2016/0243704 A1* | 8/2016 | Vakanski | B25J 9/1664 |
| 2016/0378117 A1* | 12/2016 | Szatmary | G06V 10/145 382/153 |
| 2017/0087766 A1* | 3/2017 | Chung | G01N 33/5058 |
| 2017/0332872 A1* | 11/2017 | Jun | A47L 11/4066 |
| 2018/0154518 A1* | 6/2018 | Rossano | B25J 9/1671 |
| 2019/0299523 A1* | 10/2019 | Wu | B29C 64/209 |
| 2019/0320867 A1* | 10/2019 | Noh | B25J 9/16 |
| 2020/0238517 A1* | 7/2020 | Diankov | B25J 9/1697 |
| 2020/0368861 A1* | 11/2020 | Artigas | B62D 65/00 |
| 2021/0129330 A1* | 5/2021 | Pipe-Mazo | B25J 9/16 |
| 2021/0129342 A1* | 5/2021 | Ando | G06T 7/11 |
| 2022/0009092 A1* | 1/2022 | Watanabe | G06V 20/10 |
| 2022/0025311 A1* | 1/2022 | Zhu | C12N 5/0697 |
| 2022/0026920 A1* | 1/2022 | Ebrahimi Afrouzi | G05D 1/0219 |
| 2022/0197306 A1* | 6/2022 | Cella | G06N 20/10 |
| 2022/0371284 A1* | 11/2022 | Feng | B29C 64/227 |
| 2023/0120878 A1* | 4/2023 | Zhou | G05B 19/41845 425/62 |
| 2023/0390853 A1* | 12/2023 | Yang | B25J 5/00 |

FOREIGN PATENT DOCUMENTS

| | | | | |
|---|---|---|---|---|
| CN | 109514527 A | * | 3/2019 | ............ B25J 9/0081 |
| DE | 112019005825 B4 | * | 7/2023 | ............ B25J 13/08 |
| EP | 4186616 A1 | * | 5/2023 | ............ B22F 10/25 |
| FR | 2729236 A1 | * | 7/1996 | ............ B25J 9/1697 |
| KR | 20170129571 A | * | 11/2017 | |
| KR | 20180046175 A | * | 5/2018 | |

OTHER PUBLICATIONS

Large scale 3d Printing technology (Year: 2019).*
Projector guided non holonomic mobile 3d printing (Year: 2021).*
CN-109514527-A translation (Year: 2019).*
KR-20180046175-A translation (Year: 2018).*
KR-20170129571-A translation (Year: 2017).*
FR-2729236-A1 translation (Year: 1997).*
CN_105818167_B_I_translation (Year: 2018).*
DE_112019005825_B4_I_translation (Year: 2023).*
CN_108349079_A_I_translation (Year: 2018).*
Position_verification_of_a_mobile_robot_using_standard_pattern (Year: 1987).*
Structured_light_patterns_for_robot_mobility (Year: 1988).*
A. X. Lee, S. Levine, and P. Abbeel, "Learning visual servoing with deep features and fitted q-iteration," arXiv preprint arXiv:1703.11000, 2017.
B. D. Lucas, T. Kanade et al., "An iterative image registration technique with an application to stereo vision," 1981. 11 pages.
B. Thuilot, P. Martinet, L. Cordesses, and J. Gallice, "Position based visual servoing: keeping the object in the field of vision," in Proceedings 2002 IEEE International Conference on Robotics and Automation (Cat. No. 02CH37292), vol. 2. IEEE, 2002, pp. 1624-1629.
D. Zheng, H. Wang, J. Wang, S. Chen, W. Chen, and X. Liang, "Image-based visual servoing of a quadrotor using virtual camera approach," IEEE/ASME Transactions on Mechatronics, vol. 22, No. 2, pp. 972-982, 2016.
E. Malis, F. Chaumette, and S. Boudet, "2 ½ d visual servoing," IEEE Transactions on Robotics and Automation, vol. 15, No. 2, pp. 238-250, 1999.
E. Olson, "Apriltag: A robust and flexible visual fiducial system," in 2011 IEEE International Conference on Robotics and Automation. IEEE, 2011, pp. 3400-3407.
F. Chaumette and S. Hutchinson, "Visual servo control. i. basic approaches," IEEE Robotics & Automation Magazine, vol. 13, No. 4, pp. 82-90, 2006.
J. Currence, R. Morales-Ortega, J. Steck, and W. Zhou, "A floor power module for cooperative 3d printing," Proceedings of the 28th Annual International Solid Freeform Fabrication Symposium, 2017. 23 pages.
J. Gao, A. A. Proctor, Y. Shi, and C. Bradley, "Hierarchical model predictive image-based visual servoing of underwater vehicles with adaptive neural network dynamic control," IEEE transactions on cybernetics, vol. 46, No. 10, pp. 2323-2334, 2015.
J. Lv, H. Shen, and J. Fu, "Large-scale 3d printing technology based on the visual stitching method," Rapid Prototyping Journal, 2019. 9 pages.
J. T. Feddema and O. R. Mitchell, "Vision-guided servoing with feature-based trajectory generation (for robots)," IEEE Transactions on Robotics and Automation, vol. 5, No. 5, pp. 691-700, 1989.
J. Tobin, R. Fong, A. Ray, J. Schneider, W. Zaremba, and P. Abbeel, "Domain randomization for transferring deep neural networks from simulation to the real world," in 2017 IEEE/RSJ International Conference on Intelligent Robots and Systems (IROS). IEEE, 2017, pp. 23-30.
L. G. Marques, R. A. Williams, and W. Zhou, "A mobile 3d printer for cooperative 3d printing," in Proceeding of the 28th International Solid Freeform Fabrication Symposium, 2017, pp. 1645-1660.
L. Poudel, W. Zhou, and Z. Sha, "A generative approach for scheduling multi-robot cooperative three-dimensional printing," Journal of Computing and Information Science in Engineering, vol. 20, No. 6, 2020. 12 pages.
L. Weiss, A. Sanderson, and C. Neuman, "Dynamic sensor-based control of robots with visual feedback," IEEE Journal on Robotics and Automation, vol. 3, No. 5, pp. 404-417, 1987.
M. E. Tiryaki, X. Zhang, and Q.-C. Pham, "Printing while moving: a new paradigm for large-scale robotic 3d printing," arXiv preprint arXiv:1809.07940, 2018. 6 pages.
W. J. Wilson, C. W. Hulls, and G. S. Bell, "Relative end-effector control using cartesian position based visual servoing," IEEE Transactions on Robotics and Automation, vol. 12, No. 5, pp. 684-696, 1996.
X. Zhang and Q.-C. Pham, "Planning coordinated motions for tethered planar mobile robots," Robotics and Autonomous Systems, vol. 118, pp. 189-203, 2019.
X. Zhang, M. Li, J. H. Lim, Y. Weng, Y. W. D. Tay, H. Pham, and Q.-C. Pham, "Large-scale 3d printing by a team of mobile robots," Automation in Construction, vol. 95, pp. 98-106, 2018.
Z. Zhang and D. Scaramuzza, "A tutorial on quantitative trajectory evaluation for visual (-inertial) odometry," in 2018 IEEE/RSJ International Conference on Intelligent Robots and Systems (IROS). IEEE, 2018, pp. 7244-7251.

* cited by examiner

ATE FOR REAL-WORLD EXPERIMENT

| ATE (mm) | RMS | Median | Max |
|---|---|---|---|
| Without Constraints | 19.28 | 10.13 | 57.67 |
| With Constraints | 1.67 | 3.12 | 7.30 |

FIG. 10

WALL THICKNESS FOR REAL-WORLD EXPERIMENT

| Wall Thickness (mm) | GT | Mean | Maximum | Minimum | St.Dev |
|---|---|---|---|---|---|
| Without Constraints | 2.00 | 3.72 | 4.92 | 2.33 | 0.40 |
| With Constraints | | 3.02 | 4.17 | 2.74 | 0.24 |

FIG. 13

DISPLAY GUIDED HIGH-ACCURACY ROBOTIC NAVIGATION AND MOTION CONTROL SYSTEM AND METHODS

CROSS-REFERENCE TO RELATED APPLICATIONS

This application claims priority to U.S. provisional application No. 63/185,644 filed on May 7, 2021, incorporated herein by reference in its entirety.

STATEMENT REGARDING FEDERALLY SPONSORED RESEARCH OR DEVELOPMENT

This invention was made with government support under CMMI-1932187 awarded by the National Science Foundation. The government has certain rights in the invention.

BACKGROUND OF THE INVENTION

Mobile robotic devices, also known as mobile manipulators, are of growing interest in the field of robotics. Mobile robotic devices and their systems can be used for applications ranging from construction and/or manufacturing applications such as painting, assembly, additive manufacturing, to warehouse operations, medical applications, and agricultural applications, among many other use cases known in the art. Mobile manipulators have advantages including an unlimited workspace and additional degrees of freedom.

Many mobile robotic systems utilize visual servoing to perform movement operations. Typical implementations can utilize fixed environmental reference points such as barcodes to determine the spatial positioning of a robotic system. However, these systems are very rigid and can be expensive to implement, especially if regular changes need to be made to the robotic control instructions, such as for applications like additive manufacturing.

Fused deposition modeling (FDM) is a common type of additive manufacturing (AM) method. A conventional FDM 3D printer is typically implemented as a gantry system enabling 3 degrees-of-freedom (DOFs) control of a printhead to emit fused materials, ceramic, or even concrete precisely to designed printing positions layer by layer. Such a gantry-based printer cannot print large-scale objects, with typically size limitations of 350×350×300 mm$^3$ for desktop printers and 900×600×900 mm$^3$ for industrial ones. A gantry system also makes it difficult for multiple printers to collaborate to achieve a faster printing speed. To remove these limitations, installing the printhead as the end-effector of a mobile manipulator is an appealing option.

However, a mobile 3D printer brings several challenges to the software and hardware design of such a robotic system. First, the system no longer benefits from stepper motors on the gantry to estimate the printhead position, which is needed for the computer numerical control of the printer. For a desktop FDM printer with a millimeter-level nozzle diameter, the localization and control of the printhead must achieve a millimeter or even sub-millimeter level to ensure successful printing. Otherwise, the layer-by-layer mechanism could easily fail before completing the printing.

Although millimeter-level positioning in a room-scale indoor environment can be achieved by camera-based precise localization systems, such as Vicon®, the issues of such a solution are the system cost and the non-trivial setup and calibration. To support easy and friendly deployment, a cost-efficient localization and control system for a mobile 3D printer without a complex manual system calibration process is needed.

In addition to the software challenges, the hardware design of the robotic system is also non-trivial. Unlike regular mobile manipulators, which are often used for object gripping tasks, the abovementioned accuracy requirement means that the mobile platform must have good stability during its movement to minimize the vibration of the printhead. This could lead to a trade-off with the convenience of the mobile platform's planning and control and brings into question if a holonomic or a non-holonomic mobile robot should be utilized. Thus, there is a need in the art for improvements in mobile robotic systems and methods.

SUMMARY OF THE INVENTION

Some embodiments of the invention disclosed herein are set forth below, and any combination of these embodiments (or portions thereof) may be made to define another embodiment.

In one aspect, a display guided robotic navigation and motion control system comprises a display system including a display surface and a display device configured to display an image including a visual pattern onto the display surface, a robotic system including a mobile robotic device and an optical sensor attached to the mobile robotic device, and a computing system communicatively connected to the display system and the robotic system.

In one embodiment, the computing system comprises a machine learning based computing system. In one embodiment, wherein the computing system includes a non-transitory computer-readable medium with instructions stored thereon, that when executed by a processor, performs steps comprising initializing the robotic system, recording via the optical sensor an initial image displayed, calibrating the robotic system via a target pattern calibration, updating the image displayed, identifying an application specific signal, performing an application, obtaining a point pattern position, updating an interaction matrix, calculating an error, updating a linear and an angular velocity, and moving the robotic system along a vector calculated based on an implemented a control law. In one embodiment, the interaction matrix is computed via a machine learning system.

In one embodiment, the robotic system includes an application specific component. In one embodiment, the application specific component is an additive manufacturing system including a printhead and an extruder. In one embodiment, the robotic system includes a battery. In one embodiment, the battery is rechargeable. In one embodiment, the battery is a Li—Po battery. In one embodiment, the robotic system includes a plurality of robotic devices where each robotic device includes at least one camera attached to the robotic device.

In one embodiment, the display device comprises a projector. In one embodiment, wherein the display device comprises a laser. In one embodiment, the display device comprises a screen. In one embodiment, the optical sensor comprises a camera. In one embodiment, the image displayed by the display device includes at least two visual feature points. In one embodiment, the display device is positioned above the display surface.

In one embodiment, the system performs a self-calibration. In one embodiment, the self-calibration is performed via a machine learning module of the computing system. In one embodiment, the robotic system is controlled via at least one of a robot operation module and a machine learning module of the computing system.

In another aspect, a display guided robotic control method comprises providing a display guided robotic system as described above, initializing the robotic system, recording an initial image displayed, calibrating the system via a target pattern calibration, updating the image displayed, identifying an application specific signal, performing an application, obtaining a point pattern position, updating an interaction matrix, calculating an error, updating a linear and an angular velocity, and moving the robotic system along a vector calculated based on an implemented control law.

In one embodiment, wherein the initialization of the robotic system further comprises training the robotic system via the steps comprising displaying a random pattern, recording an initial training image, executing a move, updating the training image displayed, calculating a Kanade-Lucas-Tomasi (KLT) optical flow, recording a linear and an angular velocity, and recording a feature points velocity. In one embodiment, the interaction matrix is computed via a machine learning system.

In another aspect, an additive manufacturing method comprises providing a display guided robotic system as described above, initializing the robotic system, recording an initial image displayed, calibrating the system via a target pattern calibration, updating the image displayed, identifying a printing signal, updating an extruder speed, obtaining a point pattern position, updating an interaction matrix, calculating an error, updating a linear and an angular velocity, and moving the robotic system along a vector calculated based on an implemented control law.

In one embodiment, wherein the initialization of the robotic system further comprises training the robotic system via the steps comprising displaying a random pattern, recording an initial training image, executing a move, updating the training image displayed, calculating a KLT optical flow, recording a linear and an angular velocity, and recording a feature points velocity. In one embodiment, the interaction matrix is computed via a machine learning system.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 10 is a table showing example experimental results for the absolute trajectory error (ATE) of a robotic system in accordance with some embodiments.

FIG. 13 is a table showing example experimental additive manufacturing results for the wall thickness of produced by a robotic system in accordance with some embodiments.

FIG. 14 shows an example experimental setup of a robotic system in accordance with some embodiments.

FIG. 15 shows an example experimental additive manufacturing result of a robotic system in accordance with some embodiments.

DETAILED DESCRIPTION OF THE INVENTION

Figure 1:
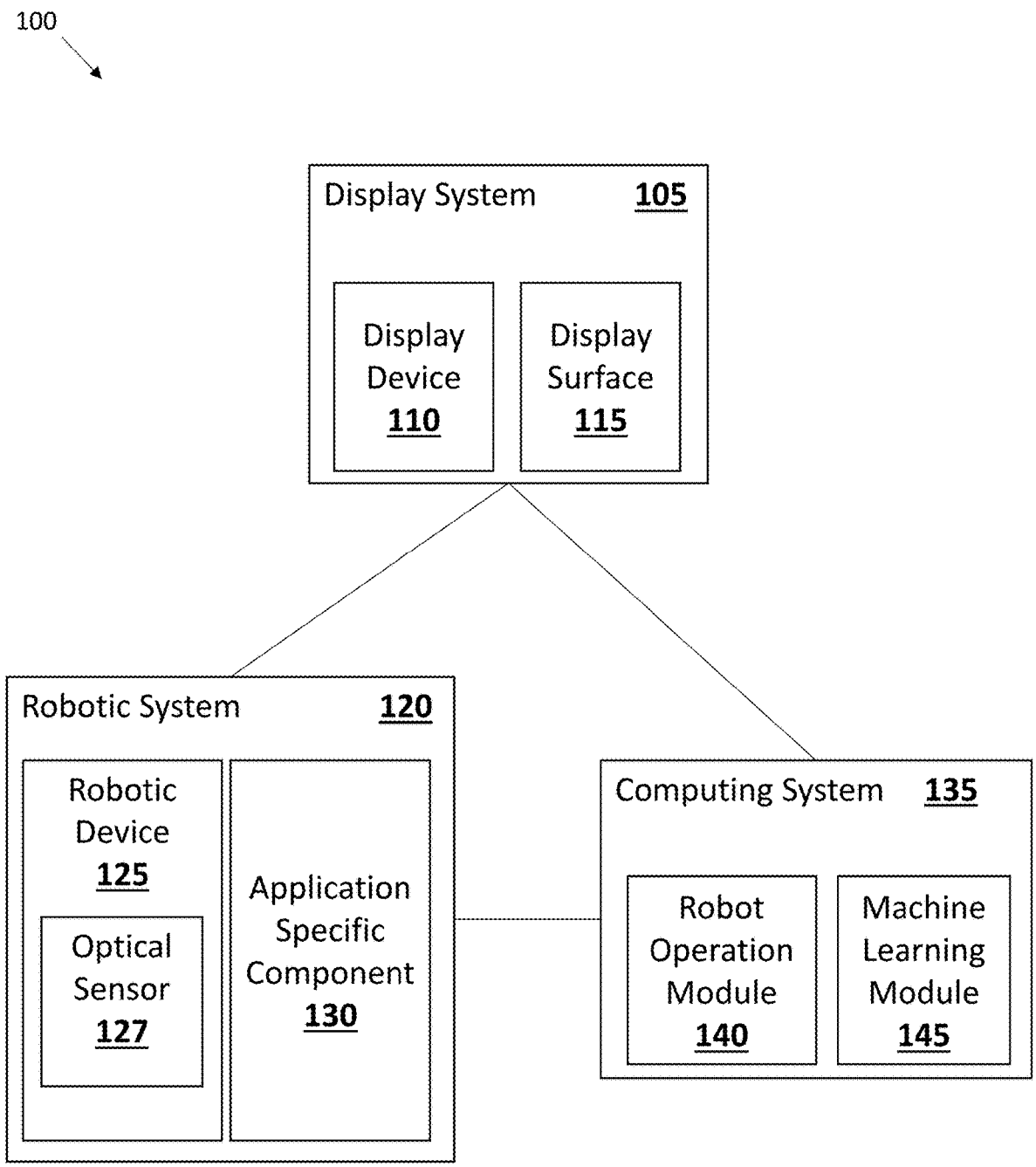
FIG. 1 is a block level system diagram showing a display guided robotic system in accordance with some embodiments.

It is to be understood that the figures and descriptions of the present invention have been simplified to illustrate elements that are relevant for a more clear comprehension of the present invention, while eliminating, for the purpose of clarity, many other elements found in systems and methods of display guided robotics. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a display guided robotic system and methods.

Figure 2:
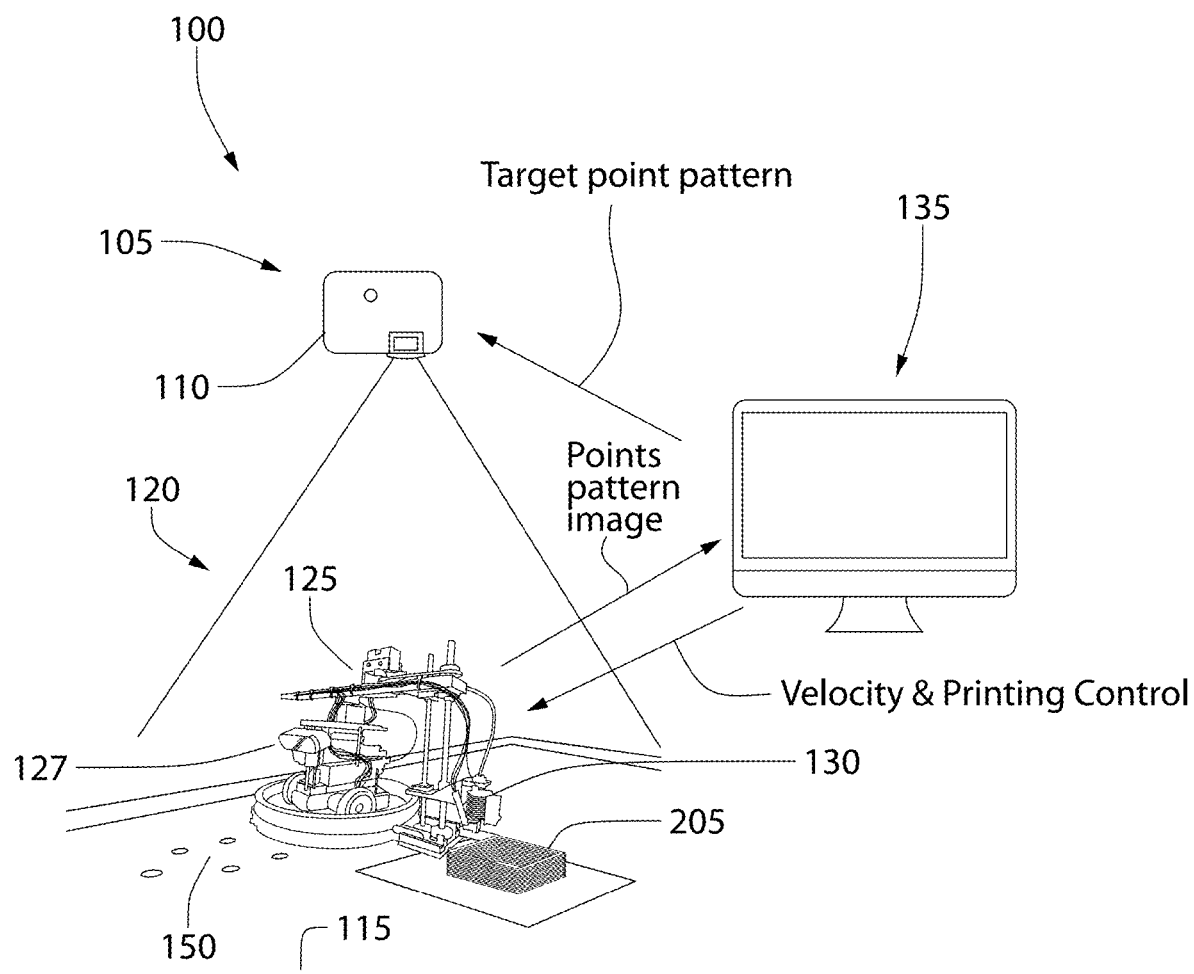
FIG. 2 shows details of an example robotic system in accordance with some embodiments.

FIG. 1 is a block level system diagram showing a display guided robotic system 100. The system 100 can include a display system 105, a robotic system 120, and a computing system 135. The display system 105 can include a display surface 115 and a display device 110 configured to display an image onto the display surface 115. In some embodiments, the display surface 115 is flat, curved, angular, smooth, and/or rough, or any combination thereof. In some embodiments, such as shown in FIG. 2, the image displayed by the display device 110 includes at least two visual feature points 150 which can be used as referential points for detection by the optical sensor 127 for the robotic system 120. These visual features 150 can be utilized to encode robotic movement and application instructions based on properties of the visual features 150 such as color, size, shape, and orientation, for example. In one example embodiment, the display device 110 is positioned above the display surface 115.

In some embodiments, the display device 110 comprises a projector. In other example embodiments, the display device 110 comprises a laser. In some embodiments, the display device 110 comprises a screen, such as, for example, a LED screen, a plasma screen, an OLED screen, an LCD screen, a CRT screen, or any other suitable screen. In some embodiments, a plurality of display devices 110 can be utilized, and can comprise at least one of a projector, a laser, a screen, and any other suitable display device, or any combination thereof.

The robotic system 120 can include a mobile robotic device 125 and an optical sensor optical sensor 127. In some embodiments, the robotic system 120 includes a plurality of robotic devices 125 where each robotic device 125 includes at least one optical sensor 127 attached to the robotic device 125. In some embodiments, the robotic system 120 includes a battery 220, which can be a rechargeable battery such as a Li—Po battery, for example.

In some embodiments, the robotic system 125 further includes at least one application specific component 130. For example, in one embodiment, the at least one application specific component 130 can include an additive manufacturing system including a printhead and an extruder. In another embodiment, the at least one application specific component 130 can include a painting or drawing system. In one embodiment, the at least one application specific component 130 can include a manipulation system for utilization in assembly and/or warehousing applications. In one embodiment, the at least one application specific component 130 can include a medical operations system for utilization in performing medical procedures. In another embodiment, the at least one application specific component 130 can include a construction and/or manufacturing system for utilization in applications such as machining (such as milling and turning), joining (such as welding, brazing, soldering, gluing and fastening), creating construction layouts. and any other suitable construction and/or manufacturing processes or combinations thereof, for example.

In one embodiment, the optical sensor 127 comprises a camera. In another embodiment, the optical sensor can comprise one or more of a camera, a lens, an avalanche photodiode (APD), a photomultiplier tube (PMT), a silicon photomultiplier (SiPM), a photoresistor, a phototransistor, a charge-coupled device (CCD), a reverse biased light-emitting diode (LED), and any other suitable optical sensor, or combination thereof. In one embodiment, the system includes a plurality of optical devices 127.

In some embodiments, the computing system 135 can include a robot operation module 140 and a machine learning module 145. In some embodiments, the computing system 135 can be part of the robotic system 120 and can be positioned on the robotic device 125. The computing system 135 can be communicatively connected to the display system 105 and the robotic system 120, and can include a non-transitory computer-readable medium with instructions stored thereon, that when executed by a processor, performs steps comprising initializing the robotic system 120, recording via an optical sensor 127 an initial image displayed, calibrating the robotic system 120 via a target pattern calibration, updating the image displayed, identifying an application specific signal, performing an application, obtaining a point pattern position, updating an interaction matrix, calculating an error, updating linear and angular velocity, and moving the robotic system along a vector calculated based on an implemented a control law.

In some embodiments, the application performed can be at least one of additive manufacturing, manipulation, assembly, a medical procedure, manufacturing, and any other suitable robotic application, or combination thereof. In some embodiments the application specific signal can be a visual feature 150 displayed by the display system 105 and can encode robotic movement and application instructions based on properties of the visual feature such as color, size, shape, and orientation, for example.

In some embodiments, the robotic system 120 is controlled via the robot operation module 140 of the computing system 135. In some embodiments, the system 100 can perform a self-calibration. The self-calibration can be performed via the machine learning module 145 of the computing system 135, for example.

FIG. 2 shows details of an exemplary display guided robotic system 100 in accordance with some embodiments. In the example shown, the system 100 is configured for additive manufacturing applications. The system 100 includes a display system 105 with a projector configured as the display device 110 positioned above the display surface 115. The display surface 115 is a flat surface comprising a medium-density fiberboard (MDF) panel suitable for 3D printing a 3D printed model 205 on. The system further includes a robotic system 120 including a mobile robotic device 125 with camera 127, and additive manufacturing application specific components 130 including an extruder and a printhead. A computing system 135 is also included in the system 100, and is in communication with the display system 105 and the robotic system 120. The computing system 135 includes a robot operation module 140 and a machine learning module 145, and also further includes a non-transitory computer-readable medium with instructions stored thereon, that when executed by a processor, performs steps comprising initializing the robotic system 120, recording via an optical sensor 127 an initial image displayed, calibrating the robotic system 120 via a target pattern calibration, updating the image displayed, identifying a printing signal, updating an extruder speed, obtaining a point pattern position, updating an interaction matrix, calculating an error, updating linear and angular velocity, and moving the robotic system along a vector calculated based on an implemented a control law.

Figure 3:
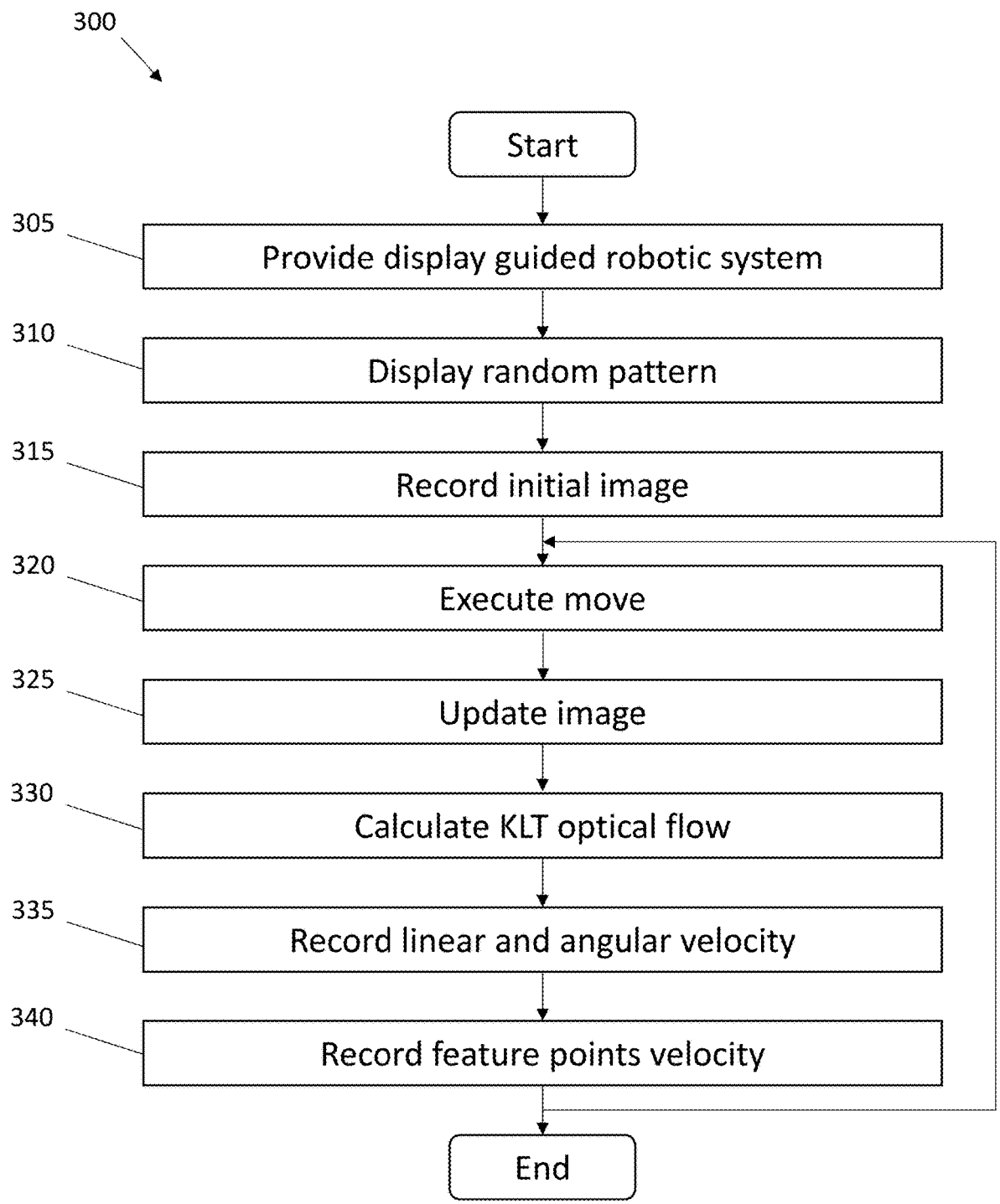
FIG. 3 is a flowchart showing a training method for a robotic system in accordance with some embodiments.

FIG. 3 is a flowchart showing a training method 300 for a display guided robotic system 100 in accordance with some embodiments. The method 300 begins at Operation 305, where a display guided robotic system 100 as described above is provided. At Operation 310 a random pattern is displayed by the display system 105. At Operation 315 an initial training image is recorded by the optical sensor 127 of the robotic system 120. At Operation 320 a move is executed by the robotic device 125 of the robotic system 120. In some embodiments, the executed move can be a random motion. At Operation 325 the training image displayed by the display system 105 is updated to a new image. At Operation 330 a Kanade-Lucas-Tomasi (KLT) optical flow is calculated by the robotic system 120 and/or the computing system 135 of system 100. At Operation 335 a linear and an angular velocity are recorded by the robotic system 120 and/or the computing system 135 of system 100. At Operation 340 a feature points velocity is recorded by the robotic system 120 and/or the computing system 135 of system 100. In some embodiments, the feature points are visual features 150 that can encode robotic movement and application instructions based on properties of the visual feature such as color, size, shape, and orientation, for example. The method 300 can repeat Operation 320, Operation 325, Operation 330, Operation 335, and Operation 340 as needed, or end.

Figure 4:
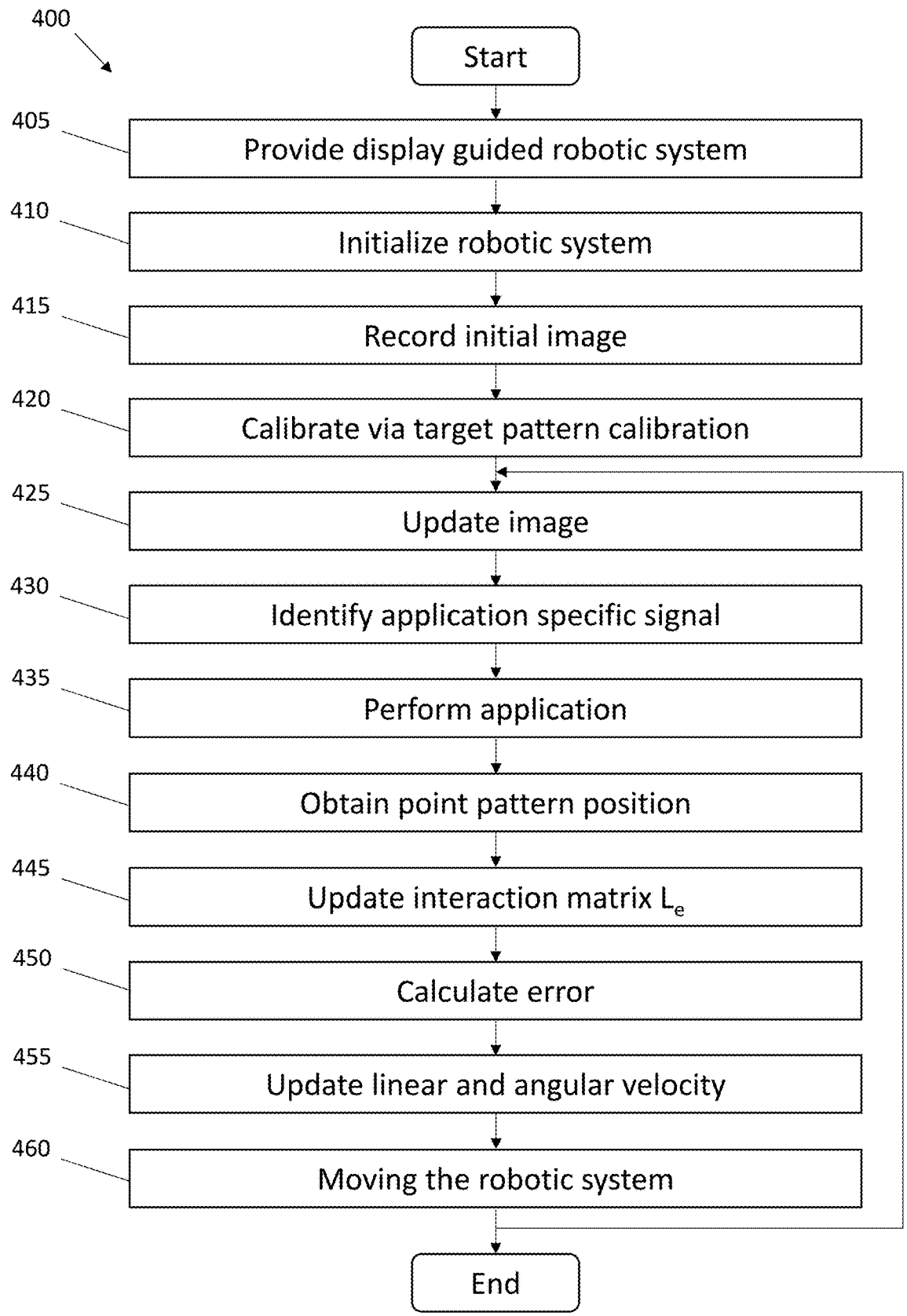
FIG. 4 is a flowchart showing a control method for a robotic system in accordance with some embodiments.

FIG. 4 is a flowchart showing a control method 400 for a display guided robotic system 100 in accordance with some embodiments. The method 400 begins at Operation 405 where a display guided robotic system 100 as described above is provided. At Operation 410 the system 100 is initialized. In some embodiments, the initialization of the system 100 includes training the system 100 as described above in method 300 of FIG. 3. At Operation 415 an initial image displayed by the display system 105 is recorded by the optical sensor 127 of the robotic system 120. At Operation 420 the system 100 is calibrated via a target pattern calibration. At Operation 425 the image displayed by the display system 105 is updated. At Operation 430 an application specific signal is identified by the robotic system 120 and/or the computing system 135 of system 100. At Operation 435 an application is performed by the robotic system 120. In some embodiments, the application performed can be at least one of additive manufacturing, manipulation, assembly, a medical procedure, manufacturing, and any other suitable robotic application, or combination thereof. At Operation 440 a point pattern position is obtained by the robotic system 120 and/or the computing system 135 of system 100. At Operation 445 an interaction matrix is updated by the computing system 135. At Operation 450 an error is calculated by the computing system 135. At Operation 455 a linear and an angular velocity are updated by the robotic system 120 and/or the computing system 135 of system 100. At Operation 460 the robotic device 125 of the robotic system 120 is moved along a vector calculated based on an implemented control law implemented by the computing system 135. In some embodiments, the vector information is encoded in visual features 150 that are displayed by the display system 105, where the visual features 150 encode robotic movement and application instructions based on properties of the visual feature such as color, size, shape, and orientation, for example. The method 400 can repeat Operation 425, Operation 430, Operation 435, Operation 440, Operation 445, Operation 450, Operation 455 and Operation 460 as needed, or end.

Some aspects of the present invention may be made using an additive manufacturing (AM) process and/or perform AM processes. Among the most common forms of additive manufacturing are the various techniques that fall under the umbrella of "3D Printing", including but not limited to stereolithography (SLA), digital light processing (DLP), fused deposition modeling (FDM), selective laser sintering (SLS), selective laser melting (SLM), electronic beam melting (EBM), and laminated object manufacturing (LOM). These methods variously "build" a three-dimensional physical model of a part, one layer at a time, providing significant efficiencies in rapid prototyping and small-batch manufacturing. AM also makes possible the manufacture of parts with features that conventional subtractive manufacturing techniques (for example CNC milling) are unable to create.

Suitable materials for use in AM processes include, but are not limited to, using materials including but not limited to nylon, polyethylene terephthalate (PET), acrylonitrile butadiene styrene (ABS), resin, polylactic acid (PLA), polystyrene, and the like. In some embodiments, an AM process may comprise building a three-dimensional physical model from a single material, while in other embodiments, a single AM process may be configured to build the three-dimensional physical model from more than one material at the same time.

Figure 5:
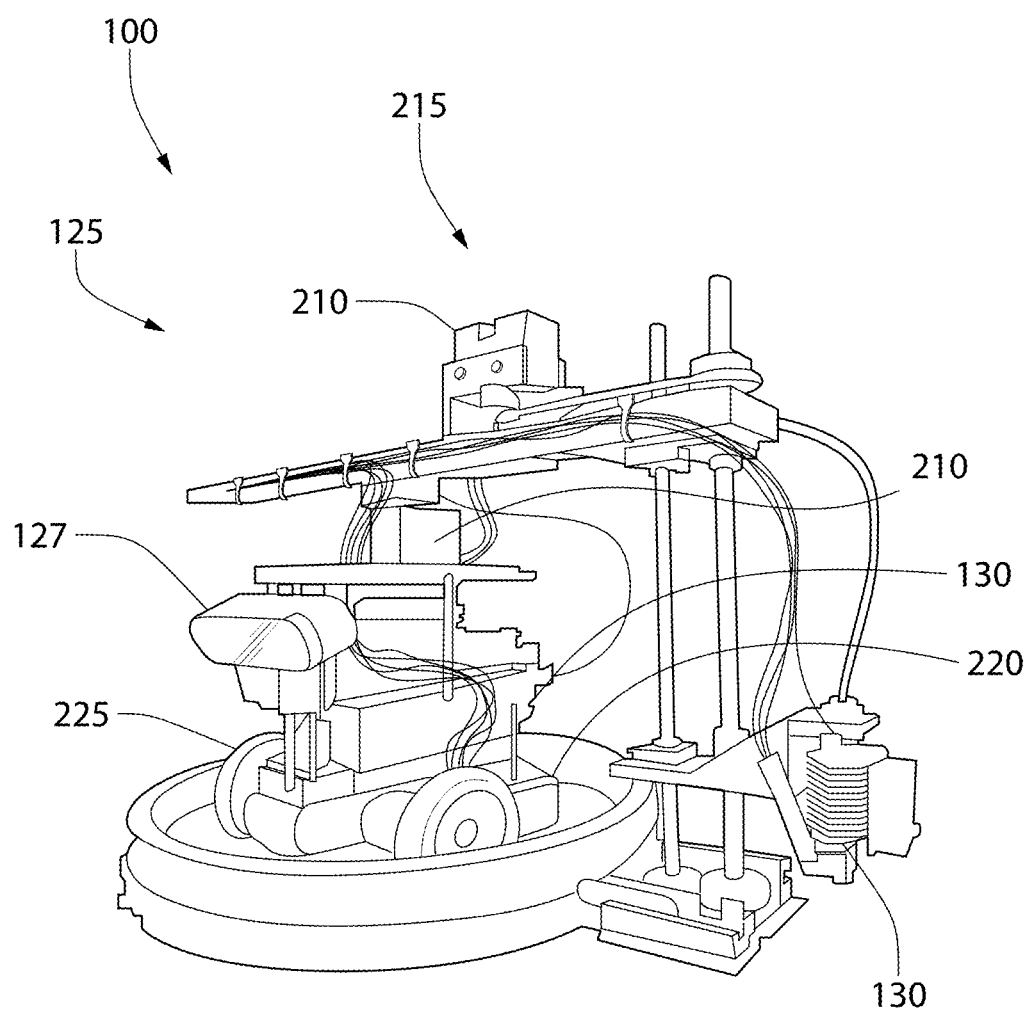
FIG. 5 shows an example robotic device of a robotic system in accordance with some embodiments.

FIG. 5 shows an example robotic device 120 of a display guided robotic system 100 in accordance with some embodiments. In the example shown, the robotic device 125 is configured to include additive manufacturing application specific components 130 including an extruder and a printhead. Furthermore, a robotic arm assembly 215 is also included and is configured to support and position the additive manufacturing application specific components 130 including the extruder and the printhead. The extruder can include a stepper motor for extrusion control of a filament, and the printhead can include a nozzle with a heating tube, a thermistor, and/or a cooling fan for controlling the plasticity properties of the filament while printing.

The arm assembly 215 can be both linearly and rotationally moved via motors 210. In the example shown, servo motors 210 are used to move the arm assembly 215, and thus the printhead 130, rotatably around the robotic device 125 via a revolute joint, as well as linearly perpendicular to the printing and display surface 115 via a lead screw. An additional plurality of motors, motor types and movement joint types can be deployed as suitable to provide additional degrees of freedom and actuations in the arm assembly 215 as specific applications require. The motor types can include stepper motors, servo motors, brushless DC electric motors, brushed DC electric motors, solenoids, and any other suitable motor type or combination thereof. The movement joint types can include revolving joints, twisting joints, rotational joints, orthogonal joints, linear joints, cylindrical joints, screw joints, planar joints, ball joints, prismatic joints, and any other suitable joints or combinations thereof.

Figure 6:
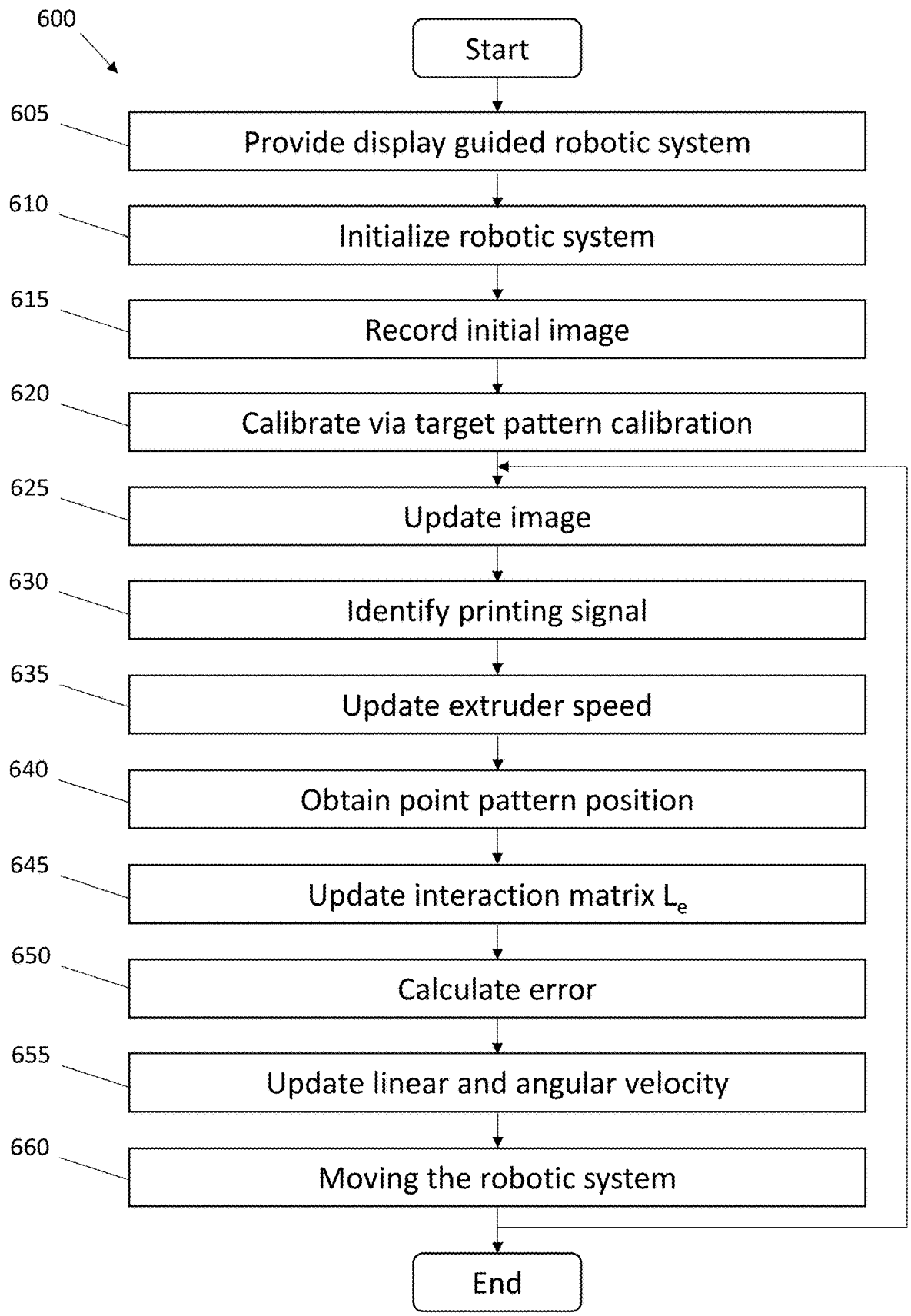
FIG. 6 is a flowchart showing an additive manufacturing method utilizing a robotic system in accordance with some embodiments.

FIG. 6 is a flowchart showing an additive manufacturing method 600 utilizing a display guided robotic system 100 in accordance with some embodiments. The method 600 begins at Operation 605 where a display guided robotic system 100 as described above is provided. At Operation 610 the system 100 is initialized. In some embodiments, the initialization of the system 100 includes training the system 100 as described above in method 300 of FIG. 3. At Operation 615 an initial image displayed by the display system 105 is recorded by the optical sensor 127 of the robotic system 120. At Operation 620 the system 100 is calibrated via a target pattern calibration. At Operation 625 the image displayed by the display system 105 is updated. At Operation 630 a printing signal is identified by the robotic system 120 and/or the computing system 135 of system 100. In some embodiments, the printing signal includes process information for additive manufacturing such as extruder speed, nozzle temperature, and any other suitable additive manufacturing process information. In some embodiments, the printing signal is encoded in visual features 150 that are displayed by the display system 105, where the visual features 150 encode printing instructions based on properties of the visual feature such as color, size, shape, and orientation, for example. At Operation 635 an extruder speed is updated by the robotic system 120. At Operation 640 a point pattern position is obtained by the robotic system 120 and/or the computing system 135 of system 100. At Operation 645 an interaction matrix is updated by the computing system 135. At Operation 650 an error is calculated by the computing system 135. At Operation 655 a linear and an angular velocity are updated by the robotic system 120 and/or the computing system 135 of system 100. At Operation 660 the robotic device 125 of the robotic system 120 is moved along a vector calculated based on an implemented control law implemented by the computing system 135. In some embodiments, the vector information is encoded in visual features 150 that are displayed by the display system 105, where the visual features 150 encode robotic movement and application instructions based on properties of the visual feature such as color, size, shape, and orientation, for example. The method 600 can repeat Operation 625, Operation 630, Operation 635, Operation 640, Operation 645, Operation 650, Operation 655 and Operation 660 as needed, or end.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Figure 7:
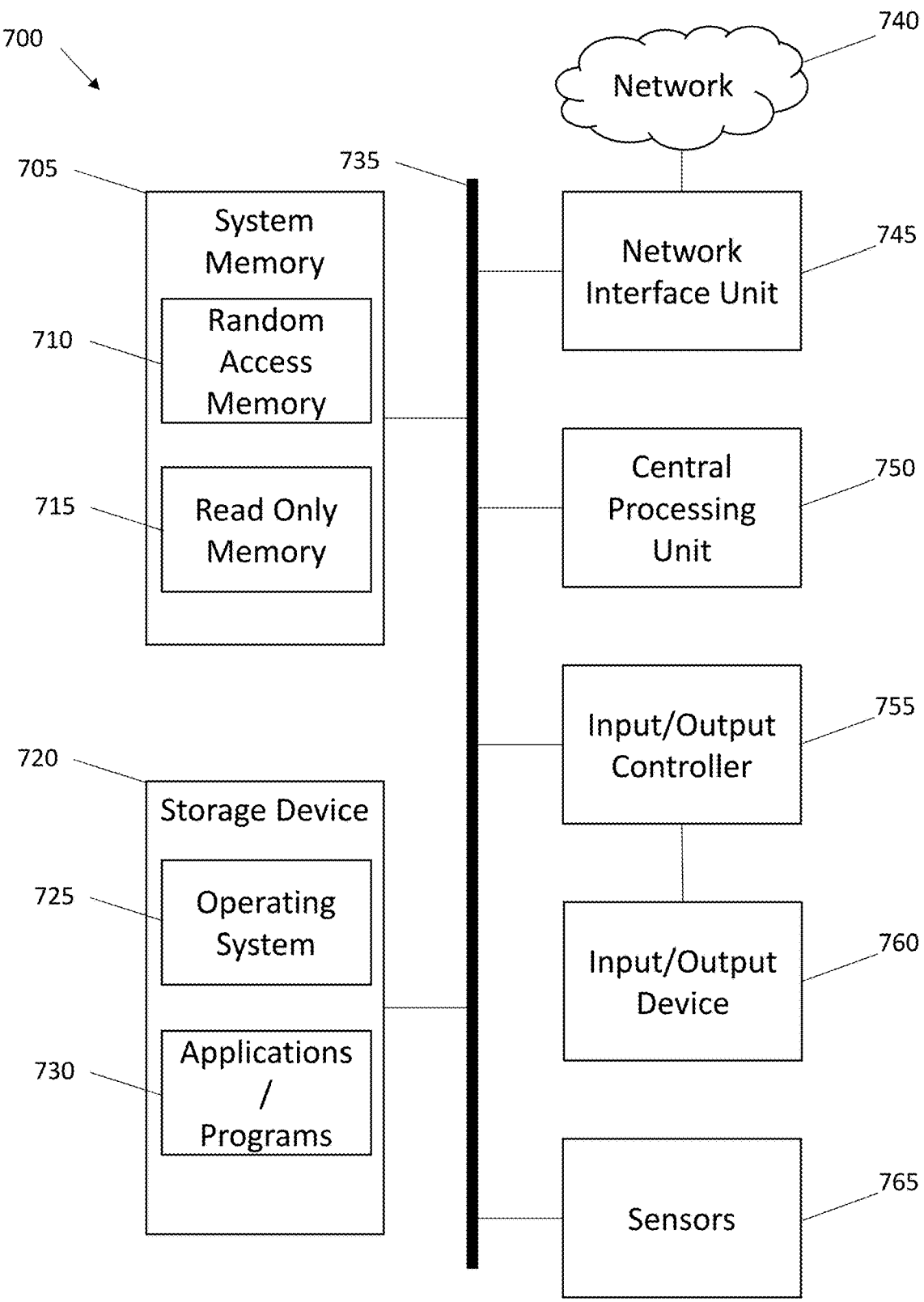
FIG. 7 is a block level system diagram showing an example computing system of a robotic system in accordance with some embodiments.

FIG. 7 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 7 depicts an illustrative computer architecture for a computer 700 for practicing the various embodiments of the invention. The computer architecture shown in FIG. 7 illustrates a conventional personal computer, including a central processing unit 750 ("CPU"), a system memory 705, including a random-access memory 710 ("RAM") and a read-only memory ("ROM") 715, and a system bus 735 that couples the system memory 705 to the CPU 750. A basic input/output system containing the basic routines that help to transfer information between elements within the computer, such as during startup, is stored in the ROM 715. The computer 700 further includes a storage device 720 for storing an operating system 725, application/program 730, and data.

The storage device 720 is connected to the CPU 750 through a storage controller (not shown) connected to the bus 735. The storage device 720 and its associated computer-readable media, provide non-volatile storage for the computer 700. Although the description of computer-readable media contained herein refers to a storage device, such as a hard disk or CD-ROM drive, it should be appreciated by those skilled in the art that computer-readable media can be any available media that can be accessed by the computer 700.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information, and which can be accessed by the computer.

According to various embodiments of the invention, the computer 700 may operate in a networked environment using logical connections to remote computers through a network 740, such as TCP/IP network such as the Internet or an intranet. The computer 700 may connect to the network 740 through a network interface unit 745 connected to the bus 735. It should be appreciated that the network interface unit 745 may also be utilized to connect to other types of networks and remote computer systems.

The computer 700 may also include an input/output controller 755 for receiving and processing input from a number of input/output devices 760, including a keyboard, a mouse, a touchscreen, a camera, a microphone, a controller, a joystick, or other type of input device. Similarly, the input/output controller 755 may provide output to a display screen, a printer, a speaker, or other type of output device. The computer 700 can connect to the input/output device 760 via a wired connection including, but not limited to, fiber optic, ethernet, or copper wire or wireless means including, but not limited to, Bluetooth, Near-Field Communication (NFC), infrared, or other suitable wired or wireless connections.

As mentioned briefly above, a number of program modules and data files may be stored in the storage device 720 and RAM 710 of the computer 700, including an operating system 725 suitable for controlling the operation of a networked computer. The storage device 720 and RAM 710 may also store one or more applications/programs 730. In particular, the storage device 720 and RAM 710 may store an application/program 730 for providing a variety of functionalities to a user. For instance, the application/program 730 may comprise many types of programs such as a word processing application, a spreadsheet application, a desktop publishing application, a database application, a gaming application, internet browsing application, electronic mail application, messaging application, and the like. According to an embodiment of the present invention, the application/program 730 comprises a multiple functionality software application for providing word processing functionality, slide presentation functionality, spreadsheet functionality, database functionality and the like.

The computer 700 in some embodiments can include a variety of sensors 765 for monitoring the environment surrounding and the environment internal to the computer 700. These sensors 765 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

Aspects of the invention relate to a machine learning algorithm, machine learning engine, or neural network. A neural network may be trained based on various attributes of a digital image for the purposes of directional vector calculation, for example, 2D feature points' positions on the image and/or the raw image pixel values, and may output, for example, a vector based on the attributes. The resulting vector may then be judged according to one or more binary classifiers or quality metrics, and the weights of the attributes may be optimized to maximize the average binary classifiers or quality metrics. In this manner, a neural network can be trained to predict and optimize for any binary classifier or quality metric that can be experimentally measured. Examples of binary classifiers or quality metrics that a neural network can be trained on include the deviation of the calculated vector from the known ground truth vector from which the projected image was generated, and any other suitable type of quality metric that can be measured. In some embodiments, the neural network may have multi-task functionality and allow for simultaneous prediction and optimization of multiple quality metrics.

In some embodiments, the neural network may be updated by training the neural network using a value of the desirable parameter associated with one or more inputs. Updating the neural network in this manner may improve the ability of the neural network in proposing optimal vectors. In some embodiments, training the neural network may include using a value of the desirable parameter associated with the ground truth vector. For example, in some embodiments, training the neural network may include predicting a value of the desirable parameter for the proposed vector, comparing the predicted value to the corresponding value associated with the ground truth vector, and training the neural network based on a result of the comparison. If the predicted value is the same or substantially similar to the observed value, then the neural network may be minimally updated or not updated at all. If the predicted value differs from that of the known vector, then the neural network may be substantially updated to better correct for this discrepancy. Regardless of how the neural network is retrained, the retrained neural network may be used to propose additional vectors.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Mobile 3D Printing:

The experiments described below were performed with a display guided robotic system 100 using a robotic device 125 with application specific components 130 as described in FIGS. 2 and 5. As shown in FIGS. 2 and 5, the mobile 3D printing system included a mobile robotic device 125, a top-down projector 110 and a flat printing surface 115. The robotic device 125 was comprised of a TurtleBot and a robotic arm with an FDM hotend kit. The TurtleBot provided continuous movement, and the robot arm helped the printhead nozzle reach positions on the printing surfaces. An entry-level projector 110, BenQ MS535A SVGA, was used to project a dynamic point pattern as the observation reference on the printing surface 115. The robotic device's onboard computer computed the printing trajectory and velocity information from a projected image. The flat surface 115 as a projection screen provided a borderless build plate for the entire mobile 3D printing system 100.

The accuracy of traditional gantry-based 3D printing relies on counting the steps of a stepper motor's output. For mobile 3D printing, the biggest challenge is how to localize a robot, because the accuracy and reliability of the wheel encoder and Inertial measurement unit (IMU) cannot provide satisfactory position feedback. Therefore, some pioneers have explored different types of localization methods for mobile 3D printing systems.

Marques et al.[1] proposed an omni-wheel 3D printing robot and a grid-based 3D printing system. Their mobile robot scanned a grid on the ground through an optical sensor to perceive its position when printing. In addition, their system allowed multiple robots to perform collaborative printing by operating on the same grid building plane. To avoid collisions in collaborative printing, they presented an automatically generated scheduling approach based on the dependency tree, see Poudel et al.[2] To solve the power supply problem, Currence et al.[3] created a floor power module with installed brushes on the robot that connected to the powered floor surface.

Zhang et al.[4] used a holonomic-based mobile manipulator for mobile 3D concrete printing. They cut the printing model into several parts and moved the robotic device 125 to the target workspace for printing execution. They later updated their control algorithm, see Tiryaki et al.[5]. This algorithm could obtain localized feedback and adjust the motion error from the AprilTags[6] on the ground. Since concrete needs to be pumped through a pipe, Zhang[4] and Pham[7] designed an algorithm that included four different modes to solve the motion planning problem for multiple tethered planar mobile robots. Lv et al.[8] proposed a holonomic mobile printing method by switching the workspace and used the contour of the printed object to estimate the pose of the robotic device 125 and update the mobile device control.

Holonomic vs. Non-Holonomic Mobile Platform:

The main differences between the above mobile 3D printing systems and the system 100 of the present invention were twofold. First, a non-holonomic robot was used as the printing platform. According to previous printing results of Marques et al., although omni-wheel-based holonomic robots can be more convenient in terms of control and path planning, they still cannot avoid the shifting between printed layers caused by a slip on the orthogonal direction of the robot motion. The differential drive of robot of system 100 uses standard wheels and does not suffer from slippage in the orthogonal direction. This also allows odometry to be done based on wheel encoders, which is more difficult in omniwheel robots. The second difference is the localization system. Their printing platforms operate in an absolute Cartesian coordinate frame. The accuracy of those systems relies on the grid, which requires manual setup on the ground. The system 100 used a projector-based visual servoing control, which required no robot pose feedback in a Cartesian frame, nor any non-trivial manual calibration or setup.

Visual Servoing Control:

Prior work on visual servoing (VS) control generally fell into three categories: position-based, image-based, and fusion approaches.[9-10] These three types of visual servoing methods control the robot movement by reducing the error between the observed image and error feedback from different spaces.

Position-based visual servoing (PBVS)[11-14] evaluates the error feedback from the observed object in the 3D Cartesian space. This is called 3D visual servoing. These types of methods require the camera intrinsic parameters to convert all the observed object pose to a 3D coordinate system. Therefore, the accuracy of the camera calibration and the robot model will directly affect the control output.

In image-based visual servoing (IBVS)[15-17] control, the robot will minimize the error directly in the image space. This is also called 2D visual servoing. Because of the estimation error in image space, these methods are insensitive to the calibration errors of the cameras on the robot. The disadvantages of IBVS are lost feature points during the rotation of the robot. The singularity of the Jacobian matrix can also cause control failures. Combining the advantages of both, Malis et al.[10] proposed a 2.5D visual servoing using the homography between planar targets.

The method utilized by the system 100 is related to but different from all of the abovementioned methods. Similar to Lee et al.[18] self-supervised deep learning was used to automatically discover the interactive matrix, thereby removing all manual calibration processes in the system.

Mechanical Design:

The mobile platform was developed on a Robotis TurtleBot3 burger. The TurtleBot3 burger is a compact size differential drive mobile robot. It operates on two dynamic wheels powered by a Dynamixel XL430-W250. The original design of the TurtleBot3 included stacked motors with a battery, driver board, and single-board computer (SBC) separated by four plastic plates. As shown in FIG. 5, a 360° rotating robot arm 215 was installed on the top layer. The bottom layer was expanded with an additional four parts such that the whole bottom became a circular shape. To avoid robot arm motion in the radial direction, a flexible curtain track was installed on the bottom plate to ensure the whole robotic arm rotated simultaneously.

The robot arm assembly 215 comprised of two actuated degrees-of-freedom (DoFs). The proximal DoF was a revolute joint whose rotation axis was perpendicular to the top surface. The distal DoF was a prismatic joint that was orthogonal to the proximal DoF. Each joint was driven by a Robotis Dynamixel XM430-W350 smart servo motor 210. Each servo motor 210 integrated a motor controller, network communication and wheel encoder. The robot arm's main structure 215 had three separate ABS 3D printed parts, linked by aluminum hole pattern beams at the top and bottom. An optional circle track cart helped reduce the horizontal vibration of the robot arm when the arm length is extended in the radial direction. The repeating 3.5-mm holes on the aluminum beam provided a flexible arm length in the radial direction. The structure of the vertical prismatic joint was designed with one 8-mm lead screw and one 6-mm round shafting support rail fixed by a pillow block flange bearing. The printer head holder achieved vertical movement by connecting with the lead screw nut. A hot-end kit (Lerdge BP6 with 8-mm nozzle) was installed on the end of the printer head holder. To reduce sliding friction and to better support the weight of the printhead, an additional ball caster wheel was added to the bottom of the arm block.

Mechatronic and Software System:

The control system 140 was modified from TurtleBot3's mechatronic system architecture. The main control system 140 comprised of an OpenCR (driver board) and Jetson Nano (SBC), as shown in FIG. 5. As a driver board, OpenCR was connected to four servo motors through serial communication, two for the wheels and the other two for the robot arm. OpenCR's GPIO pins were used to control the heating tube, the cooling fan, and to send the signal output to the extruder's stepper motor. Due to the different operating voltages and current settings of the actuators, the heating tube and the cooling fan were controlled through additional MOSFET breakout boards. A thermistor (100KNTC3950) provided nozzle temperature feedback by connecting with a 4.7K Ohm pull-up resistor. Due to multiple micro-stepper settings, the TB6600 was used as a stepper motor driver. Two 11.1 V Li—Po batteries were attached on the bottom layer, one for the control circuits and the other for all the actuators.

Robot Operating System (ROS) was used for the control software 140 to communicate with and synchronize the nodes, and to handle all low-level device control. Three additional nodes and customized messages were also created, which worked with the original TurtleBot3 libraries. Two of the nodes were used to maintain the heating temperature of the hot-end and publishing the direction and speed topic for extruder control. The other node calculates the pixel errors between the desired and the captured pattern positions and sends the errors back to the main control program.

Learning-Based Visual Servoing (LB VS):

To use visual servoing to control the 2D movement of the mobile base, the interaction matrix $L_e \in \mathbb{R}^{2\times 2}$ between the control input $v_\theta=[v, \omega]^T$ (i.e., linear and angular velocities) and the image pixel measurements $u=[u_x, u_y]^T$ of a target feature point such that $\dot{u}=L_e v_\theta$ needed to be determined. To make the robot system 100 easy to use and automatically deployable, unlike the classic IBVS or 2.5D-VS methods described in Chaumette et al., IEEE Robotics & Automation Magazine, vol. 13, no. 4, pp. 82-90, 2006, and Malis, et al., IEEE Transactions on Robotics and Automation, vol. 15, no. 2, pp. 238-250, 1999, each incorporated herein by reference in their entirety, any intrinsic/extrinsic/hand-eye calibration of the camera, and any feature point depth estimation were avoided. This was achieved using a machine-learning-based approach to find a dynamics model, as described below.

Utilizing the prior knowledge that a homography exists between the ground plane and the camera plane, the interactive matrix was modeled as a function of the pixel location, were $L_e(u): \mathbb{R}^2 \to \mathbb{R}^{2\times 2}$. If this matrix function is given, the control law of the mobile base is the same as in the classic IBVS: $v_\theta = -\lambda L_e^+ e$, where $L_e^+ = (L_e^T L_e)^{-1} L_e^T$, $e=u-u^*$, and $u^*$ is the desired image location of a feature point. Note that in a dynamic trajectory following case, e is the optical flow of the feature point from the current to the previous frame. Given M tracked feature points, $e=[e_1^T, \ldots, e_M^T]^T \in \mathbb{R}^{2M\times 1}$ is the stacked error vector (i.e., the optical flow), and $L_e=[L_e(u_1)^T, \ldots, L_e(u_M)^T]^T \in \mathbb{R}^{2M\times 2}$ is the stacked image Jacobian evaluated at each feature point, and the resulting control $v_\theta$ jointly regulates each feature point's error vector via the least squares principle.

The interaction matrix function $L_e(u)$ can be modeled as a simple multi-layer perceptron (MLP), for example, a ReLU MLP (2-64-64-64-4) with three 64-dimensional hidden layers. The challenge is determining how to estimate this MLP automatically. Fortunately, the system can take advantage of the projector and the ground plane utilized. During the automatic system calibration stage, a set of N random colored dots can be projected on the ground such that these points cover enough area on the image plane. The mobile base can be controlled with a sequence of T frames of random velocity commands $[v_\theta^1, \ldots v_\theta^T]$ while recording the color dots' image measurements at each frame as $[U^0, U^1, \ldots, U^T]$, where $U^t=[u_1^t, \ldots u_N^t]$. By denoting the i-th point's optical flow vector at frame t as $f_i^t = u_i^{6+1} - u_i^t$, the MLP can be trained by minimizing the L2 loss over this dataset as:

$$\min_{L_e} \frac{1}{T} \sum_t \frac{1}{N} \sum_i \| L_e(u_i^t) v_\theta^t - f_i^t \|^2 \tag{1}$$

The LBVS method has a desirable property in that it is generally applicable to a wide range of camera lenses, such as perspective or fisheye lenses for example, and can be calibrated automatically.

Additional Control Constraints:

By adding additional control constraints, the robotic device 125 can drive more smoothly and avoid speed overshoot. As presented above, the LBVS speed control equation is $v_\theta = -\lambda L_e^+ e$. $\lambda$ is divided into two parts based on the distance to the target point pattern. As the robot approaches to the pattern, $\lambda$ was lowered to prevent speed overshoots. For large e, a larger $\lambda$ was used to reduce the error e quickly. As shown in the experimental results below, LBVS sometimes can still lose track of the point pattern during rotation. Thus, an additional mode was included to optimize the rotation. In this mode, $L_e$ can be estimated as long as position information of any three points from the point pattern can be obtained. The maximum linear velocity was constrained to 0.025 m/s and the maximum angular velocity was constrained to 0.05 rad/s.

Experimental Setting:

Three experiments were performed to verify the feasibility of the mobile 3D printing system 100. In the first experiment, the LBVS control was tested in the simulation and real-world environment. The printing system was used to print a hand-sized model, which could also be printed by a traditional desktop 3D printer. The purpose of the second experiment was to explore and optimize the printing system by comparing with basic 3D printing models. A large-scale collaborative 3D printing was verified in the final experiment.

In the simulation environment, the robotic device 125 was driven on a plane object on the ground. This object was used to simulate the pattern's projection by updating the surface image with moving points. An odometry topic and a joint space topic for recording the position and speed of the robotic device 125 were utilized. Moveit was used to plan the trajectory and send the execution data to the robotic arm.

For the real-world environment, a projector 110 was mounted on the ceiling and adjusted for the keystone correction. To ensure that the printing surface 115 was flat and level, three 0.61 m by 1.22 m medium-density fiberboard (MDF) panels were used to form a 1.82 m by 2.44 m flat surface. Roller paper was rolled on the MDF to replace the yellow wood color. The white background allowed the camera to capture the feature points more easily. For easy removal the printing model, a Buildtak printing board was set on the paper surface in the single robot printing experiment.

The well-known KLT algorithm[19] was used to calculate the optical flow $[\dot{u}_x, \dot{u}_y]^T$ between image frames, see Lucas et al., "An iterative image registration technique with an application to stereo vision," 1981, incorporated herein by reference in its entirety. In the real-world experiment, 10,000 small triangles were projected on the printing surface with a uniform distribution. A minimum requirement was set comprising 20 feature points that needed to be capture. The real linear and angular velocities $[v, \omega]^T$ can be read directly from the joint space ROS topic. As described above, the robot was allowed to move straight forward and backward with no angular velocity while recording v and $[\dot{u}_x, \dot{u}_y]^T$ for different image points. The robot was then allowed to spin without linear velocity while recording ω and $[\dot{u}_x, \dot{u}_y]^T$ for different image points. Finally, the two datasets were combined to train the model prediction $L_e$ via equation 1. In the training process, $10^5$ feature points and 3000 frames were used as T in equation 1. The data collection and network training were completed in 30 minutes with a $1e^{-4}$ learning rate by using an Nvidia TitanV graphics card.

Figure 8A:
FIGS. 8A through 8E show example experimental results of a trajectory following experiment performed with a robotic system in accordance with some embodiments.
Figure 8B:
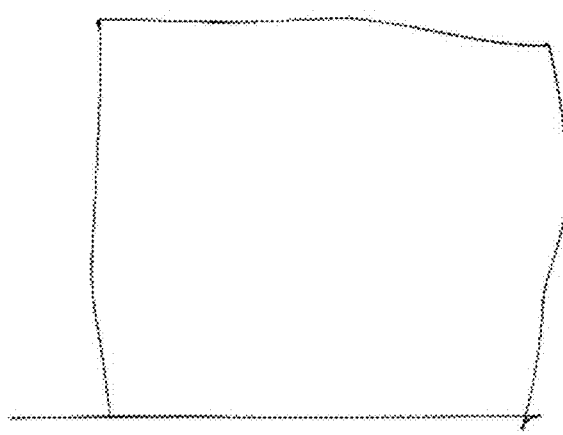
Figure 8C:
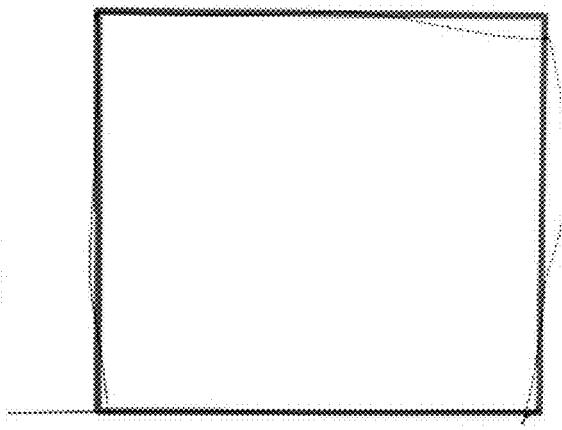
Figure 8D:
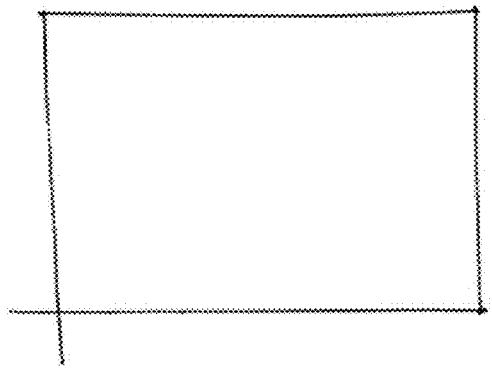
Figure 8E:
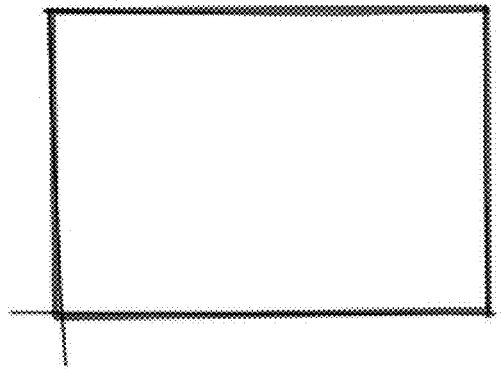
Figure 9:
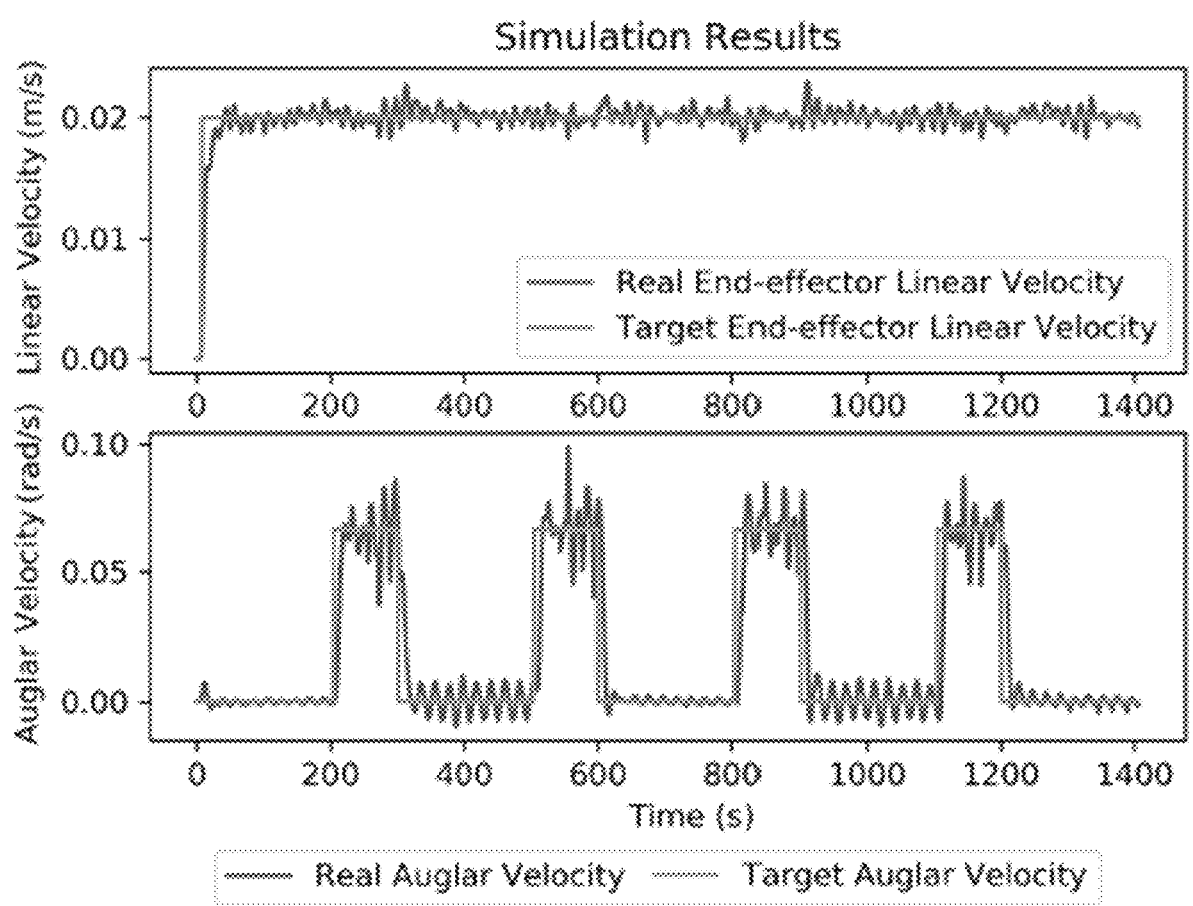
FIG. 9 shows example experimental results comparing simulated and experimental velocities of a robotic system in accordance with some embodiments.

Trajectory and Control Accuracy:

In this experiment, a rectangular motion trajectory was utilized. In Gazebo, the results showed that the LBVS could control the robotic device 125 to complete the trajectory well. FIGS. 8A through 8E show example experimental results of the trajectory following experiment performed with the robotic system 100, with FIG. 8A showing simulation results, FIGS. 8B and 8C showing real-world results of the LBVS without control constraints, and FIGS. 8D and 8E showing real-world results of the LBVS with control constraints. FIG. 9 shows example experimental results comparing simulated and experimental velocities of the display guided robotic system 100.

As shown in FIG. 9, both the linear and angular velocities of the robotic device 125 exhibited almost the same shapes as the pattern's speed. Meanwhile, as expected, there was a small delay between them. The reason was that the robotic device 125 needed to observe and process the point pattern before reacting.

For the real-world environment, the LBVS was first tested without additional control constraints. At the beginning of the trajectory, the robotic device 125 presented the same performance as that in the simulation. After the pattern rotated, there were several moments when the robot maintained a constant angular velocity due to lost points. Therefore, deviations occurred in the upper right corner, as shown in FIG. 8B. Furthermore, it was found that the robotic device 125 moved back during its rotation process. These two factors can strongly impact the printing quality and cause printing failure during the process. To optimize the LBVS control, the control constraints described above were added. As shown in FIGS. 8D and 8E, only a slight adjustment at the top edge was needed.

FIG. 10 is a table showing example experimental results for the absolute trajectory error (ATE)[20] of the system 100. As shown in the table of FIG. 10, the ATE indicated that the error of the LBVS with constraints was much smaller than that of the LBVS without constraints, with the RMS, median, and max without constraints being 19.28 mm, 10.13 mm and 57.67 mm, respectively, while the RMS, median, and max with constraints being 1.67 mm, 3.12 mm and 7.30 mm, respectively.

Figure 11A:
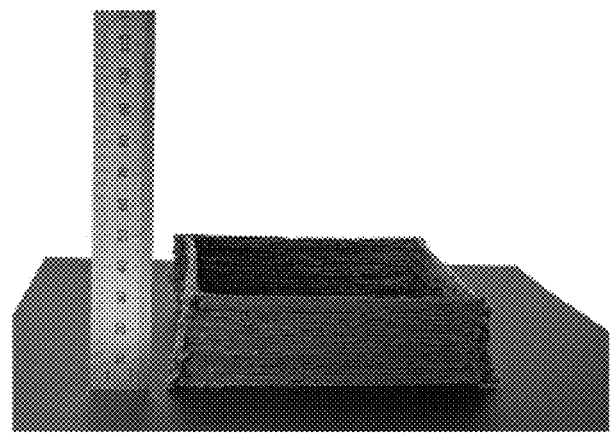
FIGS. 11A through 11C show example experimental additive manufacturing results of a robotic system in accordance with some embodiments.
Figure 11B:
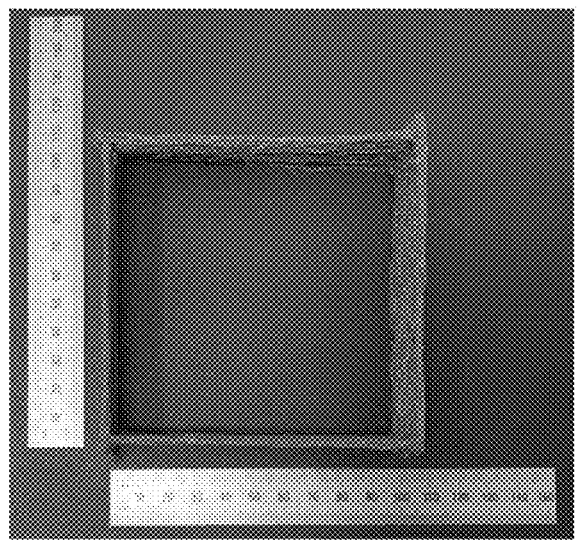
Figure 11C:
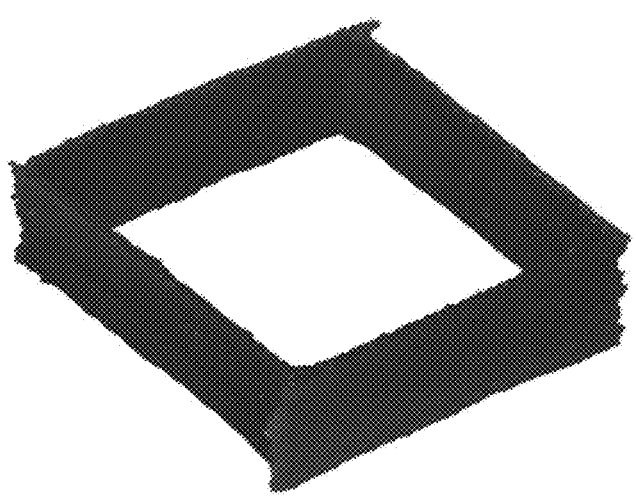
Figure 11C:
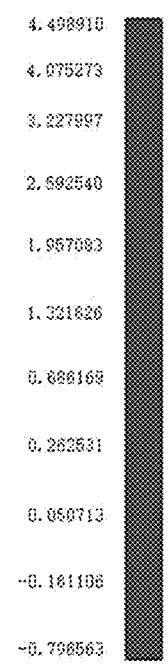
Figure 12A:
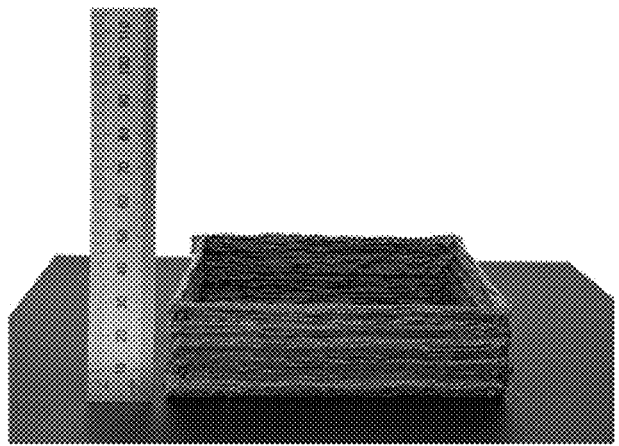
FIGS. 12A through 12C show example experimental additive manufacturing results of a robotic system in accordance with some embodiments.
Figure 12B:
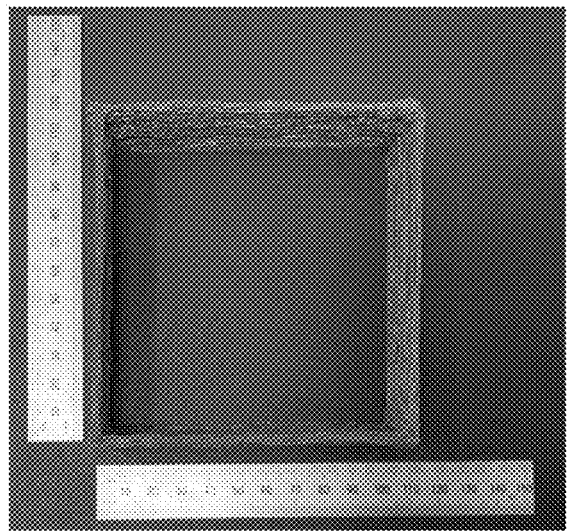
Figure 12C:
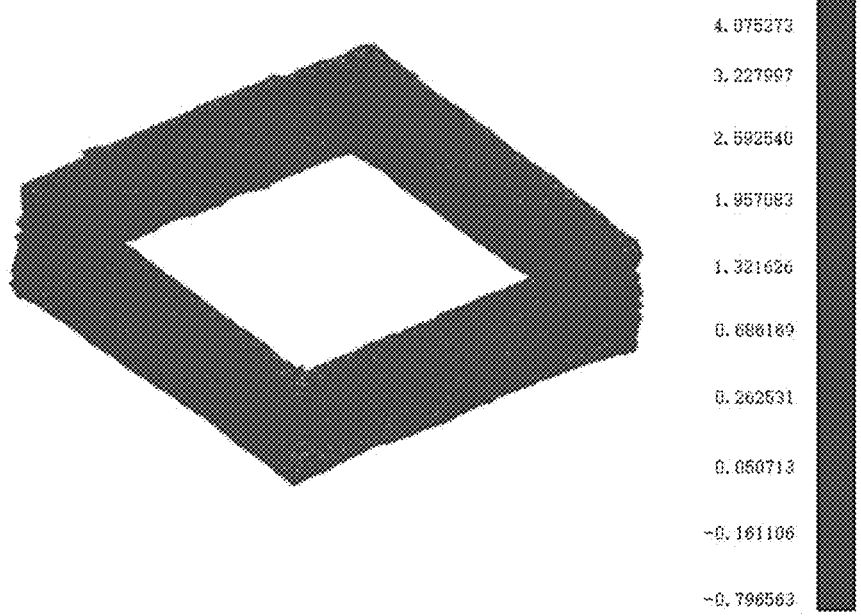

Single Robot Printing:

FIGS. 11A through 11C and FIGS. 12A through 12C show example experimental additive manufacturing results of the robotic system 100, utilizing the robotic system 120 as described above in FIGS. 1, 2 and 5. FIGS. 11A through 11C show results of a fixed-arm printing experiment, and FIGS. 12A through 12C show results of a rotation compensation printing experiment. FIGS. 11C and 12C show comparisons of scanned point cloud and ground truth for the two experiments.

A single robotic device 125 was used to print a cuboid model. Based on the previous experiments, it was discovered that the rectangle corners were the most critical positions affecting the printing results. To better handle four corners, two different corner printing methods were designed. The first method fixed the proximal joint position to −π/2 and completely relied on extruder control. The second method used the robotic arm to compensate for the rotation of the robot chassis. It kept the end effector stationary when the robotic device 125 turned.

Additionally, a new printing method was proposed that can optimize the printing results. In this method, the robotic device 125 prints front and back three times on every edge once before it turns to the next edge. Based on the previous printing results, the extruder control was adjusted, and the batteries were replaced for every 1 cm height. The printed wall thickness was measure and is presented in the table of FIG. 13 in comparison with the designed thickness as ground truth (GT). Without the abovementioned constraints the GT, mean, maximum, minimum and standard deviation were 2.00 mm, 3.72 mm, 4.92 mm, 2.33, mm and 0.40 mm, respectively, while with the constraints the GT, mean, maximum, minimum and standard deviation were 2.00 mm, 3.02 mm, 4.17 mm, 2.74, mm and 0.24 mm, respectively.

As FIGS. 11 and 12 show, the model printed by the fixed robot arm method significantly over-printed at the four corners. When the robotic device 125 completed the turn, the end effector could not always reach the previous printing endpoint. It was found that the model surface printed by the rotation compensation method was cleaner and smoother due to less over-stacking at the model's four corners.

Large-Scale Collaborative Printing:

FIG. 14 shows an example experimental setup of the system 100, specifically for collaborative printing via two mobile 3D printing robotic systems 120, and FIG. 15 shows an example experimental additive manufacturing result of the system 100. The insets of FIG. 15 show the connection points of the two trajectories.

The purpose of the final experiment was to test how the mobile 3D printing system could quickly be set up with multiple printing platforms to complete large-scale printing. Here, two robotic devices 125 were used to complete the experiment, but any suitable number can be utilized based on spatial constraints. An asymmetric contour was designed, a sword outline, which is shown in FIG. 15. This sword model had a total length of 0.80 m and a width of 0.30 m, and multiple corners that need to be turned. Each robotic device 125 needed to print half of the entire shape at the same time. The printing model had stacked layers at the sword's point and grip, as shown in the FIG. 15 insets. Furthermore, the model was printed directly on the laid roller paper instead of the traditional 3D printing surface.

During the experiment, it was found that most of the mobile printing failures similarly occurred with the standard desktop 3D printer. The most common failure is model shrinkage. The model separated from the printing surface several times. To overcome this problem, the model was overprinted at every corner except the point of the sword. Avoiding collisions and a control interference were two other issues that required concern. In this experiment, the printing trajectory was manually designed the to avoid collisions. The colors of the point pattern were also changed to avoid mutual control interference.

In conclusion, a display guided robotic system and methods are disclosed. An exemplary application of the system 100 configured to perform additive manufacturing was created and tested, and compared to a traditional 3D printer, the system 100 overcame the 3D printing size limitation inherent to the build plate and gantry structure in conventional 3D printing. Compared with prior works, the system 100 does not require any manual calibration or any world coordinates for the mobile robot's pose feedback and control. From the experimental results, the LBVS worked effectively on the non-holonomic mobile platform. The localization and control system was guided by a regular low-cost top-down projector equipped with learning-based visual servoing.

The following references are incorporated herein by reference in their entirety:

1.) L. G. Marques, R. A. Williams, and W. Zhou, "A mobile 3d printer for cooperative 3d printing," in Proceeding of the 28th International Solid Freeform Fabrication Symposium, 2017, pp. 1645-1660.
2.) L. Poudel, W. Zhou, and Z. Sha, "A generative approach for scheduling multi-robot cooperative three-dimensional printing," Journal of Computing and Information Science in Engineering, vol. 20, no. 6, 2020.
3.) J. Currence, R. Morales-Ortega, J. Steck, and W. Zhou, "A floor power module for cooperative 3d printing," Proceedings of the 28th Annual International Solid Freeform Fabrication Symposium, 2017.
4.) X. Zhang, M. Li, J. H. Lim, Y. Weng, Y. W. D. Tay, H. Pham, and Q.-C. Pham, "Large-scale 3d printing by a team of mobile robots," Automation in Construction, vol. 95, pp. 98-106, 2018.
5.) M. E. Tiryaki, X. Zhang, and Q.-C. Pham, "Printing while moving: a new paradigm for large-scale robotic 3d printing," arXiv preprint arXiv:1809.07940, 2018.
6.) E. Olson, "Apriltag: A robust and flexible visual fiducial system," in 2011 IEEE International Conference on Robotics and Automation. IEEE, 2011, pp. 3400-3407.
7.) X. Zhang and Q.-C. Pham, "Planning coordinated motions for tethered planar mobile robots," Robotics and Autonomous Systems, vol. 118, pp. 189-203, 2019.
8.) J. Lv, H. Shen, and J. Fu, "Large-scale 3d printing technology based on the visual stitching method," Rapid Prototyping Journal, 2019.
9.) F. Chaumette and S. Hutchinson, "Visual servo control. i. basic approaches," IEEE Robotics & Automation Magazine, vol. 13, no. 4, pp. 82-90, 2006.
10.) E. Malis, F. Chaumette, and S. Boudet, "2½ d visual servoing," IEEE Transactions on Robotics and Automation, vol. 15, no. 2, pp. 238-250, 1999.
11.) L. Weiss, A. Sanderson, and C. Neuman, "Dynamic sensor-based control of robots with visual feedback," IEEE Journal on Robotics and Automation, vol. 3, no. 5, pp. 404-417, 1987.
12.) W. J. Wilson, C. W. Hulls, and G. S. Bell, "Relative end-effector control using cartesian position based visual servoing," IEEE Transactions on Robotics and Automation, vol. 12, no. 5, pp. 684-696, 1996.
13.) B. Thuilot, P. Martinet, L. Cordesses, and J. Gallice, "Position based visual servoing: keeping the object in the field of vision," in Proceedings 2002 IEEE International Conference on Robotics and Automation (Cat. No. 02CH37292), vol. 2. IEEE, 2002, pp. 1624-1629.
14.) J. Tobin, R. Fong, A. Ray, J. Schneider, W. Zaremba, and P. Abbeel, "Domain randomization for transferring deep neural networks from simulation to the real world," in 2017 IEEE/RSJ International Conference on Intelligent Robots and Systems (IROS). IEEE, 2017, pp. 23-30.
15.) J. T. Feddema and O. R. Mitchell, "Vision-guided servoing with feature-based trajectory generation (for robots)," IEEE Transactions on Robotics and Automation, vol. 5, no. 5, pp. 691-700, 1989.
16.) J. Gao, A. A. Proctor, Y. Shi, and C. Bradley, "Hierarchical model predictive image-based visual servoing of underwater vehicles with adaptive neural network dynamic control," IEEE transactions on cybernetics, vol. 46, no. 10, pp. 2323-2334, 2015.
17.) D. Zheng, H. Wang, J. Wang, S. Chen, W. Chen, and X. Liang, "Image-based visual servoing of a quadrotor using virtual camera approach," IEEE/ASME Transactions on Mechatronics, vol. 22, no. 2, pp. 972-982, 2016.
18.) A. X. Lee, S. Levine, and P. Abbeel, "Learning visual servoing with deep features and fitted q-iteration," arXiv preprint arXiv:1703.11000, 2017.
19.) B. D. Lucas, T. Kanade et al., "An iterative image registration technique with an application to stereo vision," 1981.
20.) Z. Zhang and D. Scaramuzza, "A tutorial on quantitative trajectory evaluation for visual (-inertial) odometry," in 2018 IEEE/RSJ International Conference on Intelligent Robots and Systems (IROS). IEEE, 2018, pp. 7244-7251.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A display guided robotic navigation and motion control system, comprising:
   a display system including a display surface and a display device;
   a robotic system independently movable relative to the display system, including a mobile robotic device, and an optical sensor attached to the mobile robotic device; and
   a first computing system communicatively connected to the display system, configured to display an image including a visual pattern onto the display surface;
   a second computing system communicatively connected to the robotic system and the optical sensor, the computing system configured to perform steps comprising:
   detecting the visual pattern produced by the display device with the optical sensor; and
   calculating a location of the mobile robotic device via the detected visual pattern.

2. The system of claim 1, wherein the second computing system comprises a machine learning based computing system for motion control and self-calibration.

3. The system of claim 1, wherein the second computing system includes a non-transitory computer-readable medium with instructions stored thereon, that when executed by a processor, performs steps comprising:
   initializing the robotic system;
   recording via the optical sensor an initial image displayed;
   calibrating the robotic system via a target pattern calibration;
   identifying an application specific signal;
   performing an application;
   obtaining a point pattern position;
   updating an interaction matrix;
   calculating an error;
   updating a linear and an angular velocity; and
   moving the robotic system along a vector calculated based on an implemented control law.

4. The system of claim 3, wherein the interaction matrix is computed via a machine learning system.

5. The system of claim 4, wherein the machine learning system comprises learning-based visual servoing.

6. The system of claim 1, wherein the robotic system includes an application specific component.

7. The system of claim 6, wherein the application specific component is an additive manufacturing system including a printhead and an extruder.

8. The system of claim 1, wherein the robotic system includes a battery.

9. The system of claim 1, wherein the robotic system includes a plurality of mobile robotic devices where each mobile robotic device includes at least one camera attached to the mobile robotic device.

10. The system of claim 1, wherein the display device comprises a projector, a laser, or a screen.

11. The system of claim 1, wherein the optical sensor comprises a camera.

12. The system of claim 1, wherein the image displayed by the display device includes at least two visual feature points on the display surface for robot localization and motion control.

13. The system of claim 1, wherein the system is configured to perform a self-calibration.

14. The system of claim 13, wherein the self-calibration is performed via a machine learning module of the second computing system.

15. The system of claim 1, wherein the robotic system is controlled via at least one of a robot operation module and a machine learning module of the second computing system.

16. A display guided robotic control method, comprising:
    providing a display guided robotic system as described in claim 1;
    initializing the robotic system;
    recording an initial image displayed;
    calibrating the system via a target pattern calibration;
    updating the image displayed;
    identifying an application specific signal;
    performing an application;
    obtaining a point pattern position;
    updating an interaction matrix;
    calculating an error;
    updating a linear and an angular velocity; and
    moving the robotic system along a vector calculated based on an implemented control law.

17. The method of claim 16, wherein the initialization of the robotic system further comprises training the robotic system via the steps comprising:
    displaying a random pattern;
    recording an initial training image;
    executing a move;
    updating the training image displayed;
    calculating an optical flow;
    recording a linear and an angular velocity; and
    recording a feature points velocity.

18. The method of claim 16, wherein the interaction matrix is computed via a machine learning system.

19. An additive manufacturing method, comprising:
    providing a display guided robotic system as described in claim 1;
    initializing the robotic system;
    recording an initial image displayed;
    calibrating the system via a target pattern calibration;
    updating the image displayed;
    identifying a printing signal;
    updating an extruder speed;
    obtaining a point pattern position;
    updating an interaction matrix;
    calculating an error;
    updating a linear and an angular velocity; and
    moving the robotic system along a vector calculated based on an implemented control law.

20. The method of claim 19, wherein the initialization of the robotic system further comprises training the robotic system via the steps comprising:
    displaying a random pattern;
    recording an initial training image;
    executing a move;
    updating the training image displayed;
    calculating an optical flow;
    recording a linear and an angular velocity; and
    recording a feature points velocity.

21. The method of claim 19, wherein the interaction matrix is computed via a machine learning system.

* * * * *